May 12, 1953 E. C. DODT 2,638,013
REMOTE CONTROL FOR TRANSMISSIONS
Filed Sept. 27, 1951 2 Sheets-Sheet 1
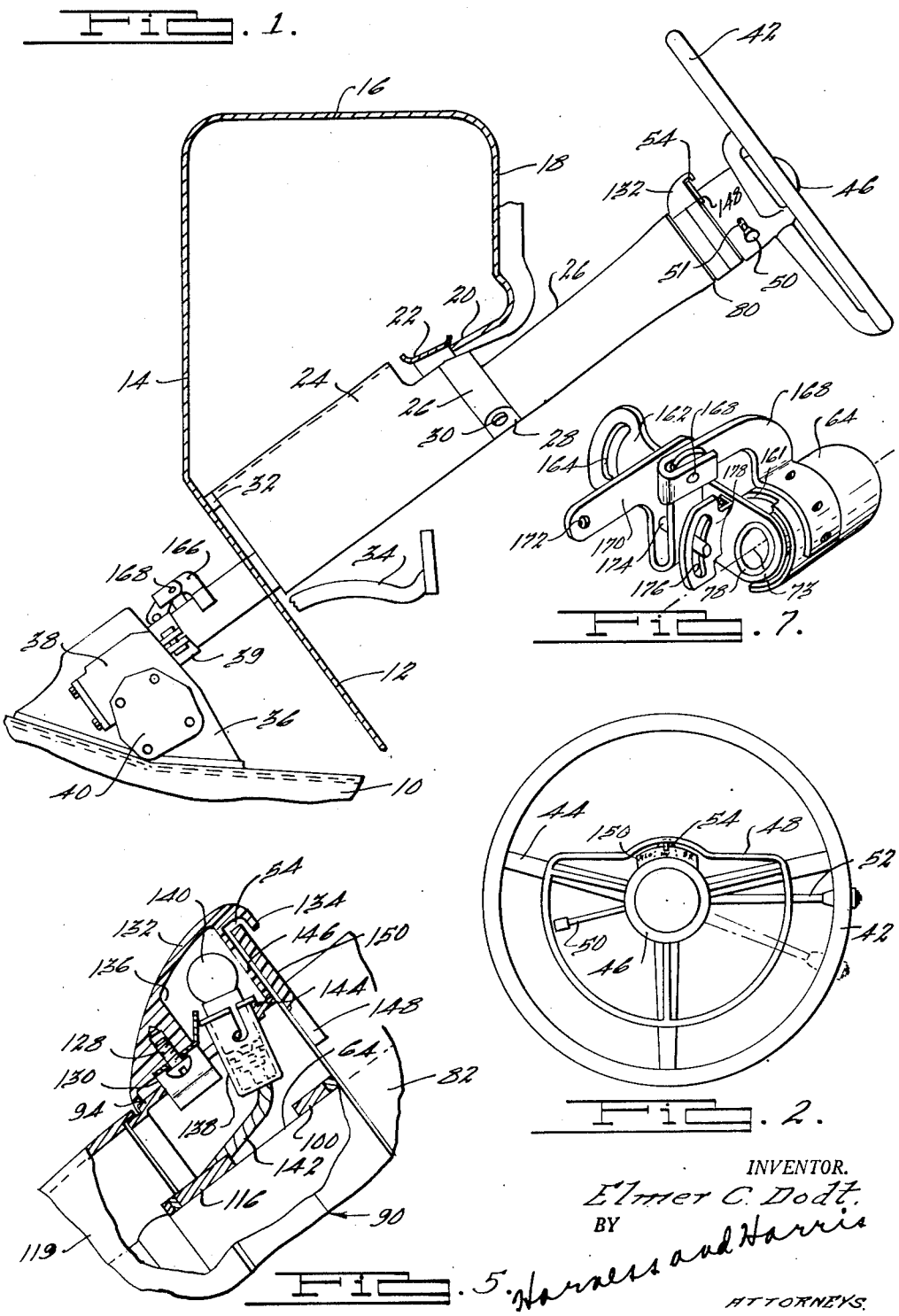
INVENTOR.
Elmer C. Dodt.
BY Harness and Harris
ATTORNEYS.

May 12, 1953      E. C. DODT      2,638,013
REMOTE CONTROL FOR TRANSMISSIONS
Filed Sept. 27, 1951      2 Sheets-Sheet 2
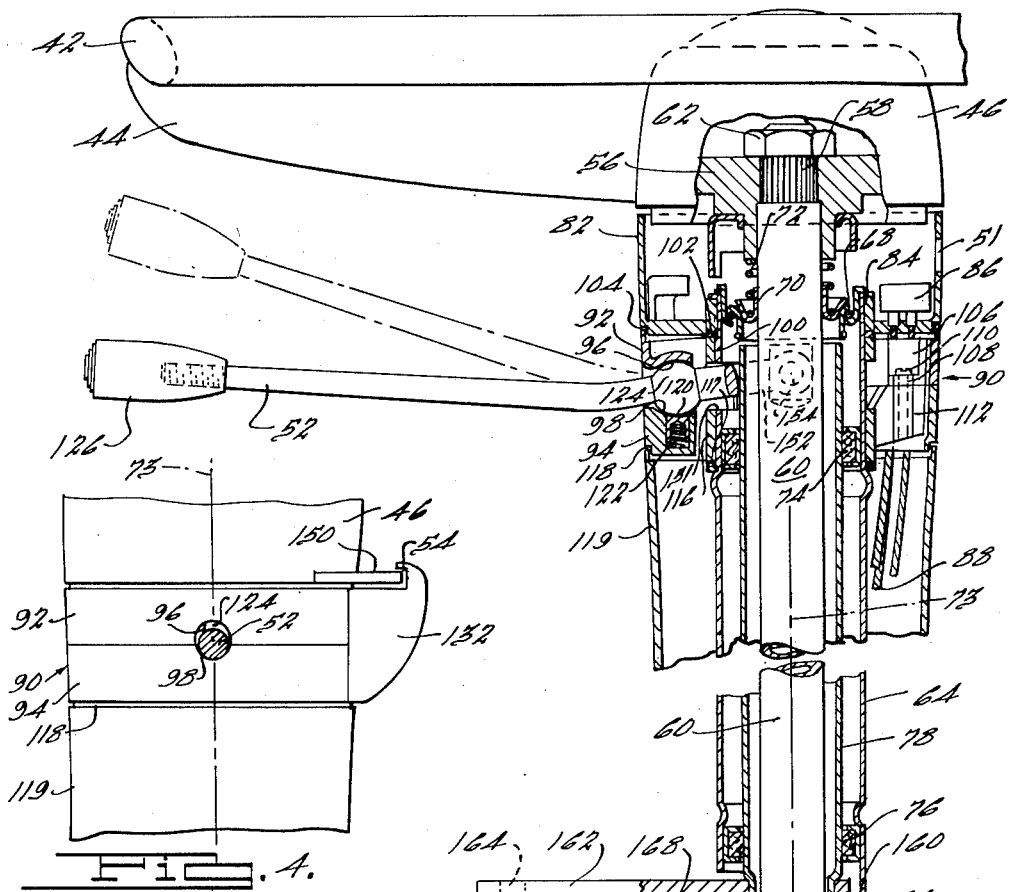
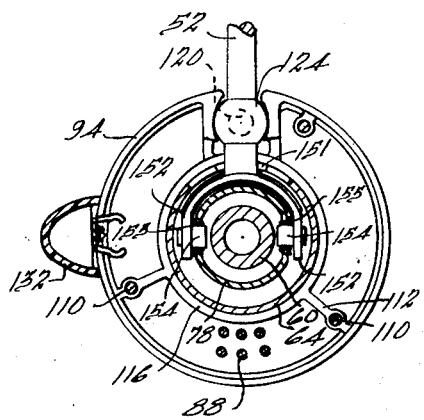
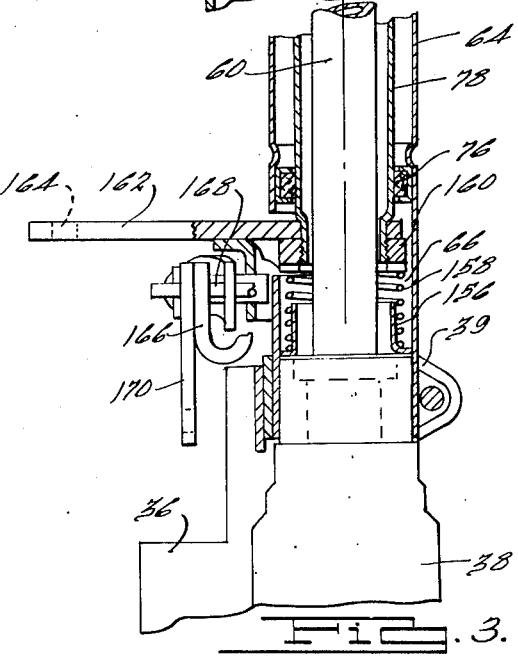
INVENTOR.
Elmer C. Dodt.
BY
Harness and Harris
ATTORNEYS.

Patented May 12, 1953

2,638,013

UNITED STATES PATENT OFFICE 2,638,013

REMOTE CONTROL FOR TRANSMISSIONS

Elmer C. Dodt, Huntington Woods, Mich., assignor to Chrysler Corporation, Highland Park, Mich., a corporation of Delaware Application September 27, 1951, Serial No. 248,557

12 Claims. (Cl. 74—484)

This invention relates to the construction of steering column transmission controls for automotive vehicles, and more particularly, to steering column transmission controls of the type in which the shifted shaft is in the form of a tube arranged concentrically exteriorly of the steering tube of the motor vehicle.

The present application is especially directed to the operating mechanism for such a control: that is, the upper end construction including the lever operated by the driver of the motor vehicle to effect the necessary movement of the shifted shaft or tube to obtain the desired operator control over the transmission. The construction of the transmission itself forms no part of this invention, and the transmission may follow various acceptable designs.

While the general advantages of the usual remote shift or steering column transmission control arrangements are described at length in the literature on the subject, there are particular advantages worthy of note in the presently disclosed structure so far as the operating mechanism itself is concerned. The phrase "operating mechanism" is used as referring to the upper end of the steering column and to the control assembly and to the operating lever which normally extends outwardly beneath the steering wheel on the right hand side of the steering column and which is manipulated by the driver to control the transmission of the vehicle as to the desired speed ratios. In the ordinary type of steering column gearshift, particularly the laterally offset, separate shaft type, this operating lever element must be mounted on a pivot, and a fulcrum forming element must also be provided to obtain the necessary leverage, both of which are usually exposed. Under these circumstances, it is extremely difficult to give any satisfactory decorative treatment to these elements and it is particularly hard to provide for adequate lubrication of them in their exposed condition. If they are lubricated, leakage is commonly experienced which tends to soil the driver's attire, and in the best of circumstances, they afford a place for the accumulation of dirt which is extremely difficult to remove.

Another disadvantage of the operating mechanism for the usual laterally offset, separate shaft type of steering column transmission controls is that they are, unless very carefully constructed, likely to become noisy and loose with continued wear.

Still another disadvantage is that most constructions of that type which have been found to be satisfactory are relatively expensive and present certain difficulties in assembly which appear to be unavoidable.

The advantage of the present construction is that the device is extremely economical to manufacture and may be made almost exclusively either from stampings, tubing, or from other structural elements of a standard section. Indeed, in the specific example shown, there is but one forging—the operating lever—and but one casting—the shroud. All other items going to make up the assembly, are either stampings or standard procurement items. This type of construction results in a large saving from material alone and when these economies are obtained without any sacrifice either in operating ease and efficiency or durability, the construction results in indeed being most desirable.

A further advantage of the particular construction shown is that the operating mechanism is supported directly on the steering column and shroud rather than through the interposition of a fixed means at the top of the steering column which has heretofore been necessary with the more usual types of transmission controls.

A further advantage of the invention is that the steering hub conceals the upper edge of the operating shaft completely in all of its various positions of operation so that as far as outward appearance is concerned, the entire assembly appears to be structurally integral. The fulcrum for the operating lever is located completely within the shroud and no protruding stumps or outboard fulcrum bearings are necessary which would interrupt the smooth contours of the shroud.

Another advantage of the construction shown is the fact that the device may be readily assembled and is equally well disassembled should service ever be required.

Yet another advantage is that due to the specific formation of the lever socket and the operating lever socketed therein, it is possible so to distribute the load over the component elements that the device is easily operated and excessive wear is avoided.

According to a feature of the invention, an annularly shrouded concentric type remote control for transmissions is provided in which a manual control lever of the first class—that is, the fulcrum is situated between the effort and resistance—is employed and yet the lever fulcrum is wholly disposed within the normal confines of the annular shroud. Accordingly, and as noted, no unsightly fulcrum-containing-stump protrudes from and breaks up the otherwise clean lines and appearance of the annular shroud of the present construction.

According to a further feature, a concentric shaft type remote transmission control is provided in which all bearing support for the concentric shaft is through frictional sliding bearing means located both at top and bottom of the shaft. The inherent friction of these bearing means is predeterminedly arranged to be sufficient of itself to damp out engine and vehicle suspension disturbances which tend to set the controlled shaft and controlling hand lever in motion and which manifest themselves in certain instances of remote control shaft constructions having the shaft ends supported by pivots or trunnions. In the latter type constructions it sometimes becomes necessary to provide additional damping means to eliminate the rattles caused by disturbances such as just described.

Another feature of the invention is the provision of a hand-lever-operated remote control mechanism of which the hand lever is fulcrumed in a ball and socket joint of the type situated between the effort and resistance and formed with sufficient internal clearance in the joint to permit predetermined travel of the lever axially of the joint. Moreover, the wall of the socket is provided with a yieldably mounted anti-rattle member incorporated as a portion thereof which yieldingly engages the ball portion of the ball and socket and controls unrestrained movement thereof.

Further features, objects, and advantages will either be specifically pointed out or become apparent when for a better understanding of the invention reference is made to the following written description taken in conjunction with the accompanying drawings in which:

Figure 1 is a side elevation of a steered vehicle to which the present invention is applied;

Figure 2 is a plan view of the steering wheel of vehicle;

Figure 3 is a longitudinal section of the steering column of the vehicle;

Figure 4 is a face view of the ball and socket joint in the steering column of Figure 3;

Figure 5 is a section through the steering column indicator for the remote control mechanism;

Figure 6 is a transverse section of the steering column taken in the vicinity of the ball and socket joint; and Figure 7 is a perspective view of the linkage controlled by the remote control mechanism.

Generally in Figures 1 through 7 of the drawings and particularly in Figure 1 thereof, a steered automotive vehicle is shown having a frame 10 supporting the usual body, the only portion of which is indicated in section by a toe board 12, a dash 14, a cowl 16, and an instrument panel 18. The instrument panel 18 has a depending flange 20 which supports a steering column bracket 22. A yoke-like structure 26 is secured to the bracket 22 and supports the respective ends of a steering column supporting strap 28 through one or more fasteners 30 at the ends of the latter. A U-shaped trough 24 surrounds the steering column and is secured at its upper end to the yoke structure 26 and bracket 22 and is secured at its lower end by a bracket 32 to the toe board 12 of the vehicle body. Brake pedal 34 protrudes through a suitable opening, not shown, in the toe board 12 and into the passenger compartment for the vehicle. The frame or chassis 10 carries a bracket 36 which through clamp 39 supports the lower end of the steering column and also supports the worm casing 38 of the steering gear and the rockshaft casing 40.

At the upper end of the steering column there is provided a usual steering wheel 42 having inwardly radiating spokes 44 which terminate in a steering wheel hub 46. Secured above the hub 46 is a horn ring 48, and below the hub in the steering column there are located a turn signal switch lever 50 operable in a circumferentially extending slot 51 and also an operating mechanism lever 52. Also located below the hub 46 for the steering wheel there is provided a pair of cooperating transmission position indicator parts 54. The steering wheel hub 46 has an apertured portion 56 provided with an internal set of spline teeth which receivably engage a splined portion 58 formed at the upper end of a tube 60 serving as the steering shaft for the vehicle. The steering tube 60 is fastened at the upper end just noted by means of a fastener 62 engaging the hub portion 56. A steering column jacket 64 coaxially surrounds the steering tube 60 so as to define a longitudinally extending annular space 66 therebetween. The steering tube 60 is journalled at its opposite end for rotation in the steering worm casing 38. The steering column jacket 64 receives at its top end a short tubular section having a relatively reversed set of flanges, the inner flange of which serves as the outer race for a ball bearing 68. The inner race for the ball bearing 68 is engaged by a spring seat section 70 which is in turn engaged by the end of a coil spring 72. The coil spring 72 surrounds the steering shaft 60 and effects engagement against a depending flange on the steering wheel portion 56. The steering tube 60 is thus journalled for rotation in the upper end of the coaxial column jacket 64, and the upper end of the longitudinally annular space 66 is thus closed by the ball bearing 68. The coil spring 72 engaging the under side of the hub portion 56 of the steering wheel, thrusts against the spring seat section 70 and prevents any play or looseness from developing in the ball bearing 68 for the upper end of the steering tube 60.

A pair of spaced bushing type bearings 74, 76 is mounted respectively top and bottom to the inside of the column jacket 64 and provides for reception of a tubular shaft 78 which is thereby journalled for rotative and axial movement within the longitudinally extending annular space 66 between the steering tube 60 and the column jacket 64. The shaft 78 is concentric about an axis 73 with the steering tube 60 and its coaxial jacket 64. The bearings 74, 76 have permanently lubricated cores composed of an impregnated material which has desirable anti-rattle characteristics. The core material is preferably fabricated out of a multi-layer fibre fabric or a thread-wound grommet which is absorbent enough to be impregnated with and retain a compounded lubricant of the group comprising tallow, resins, and/or grease. The relative sliding friction between the relatively spaced bearings and the shaft 78 journalled therein is overcome by the thus lubricated core but only to a predetermined degree, and sufficient drag is maintained to prevent rattling and unrestrained movement of the shaft due to vibrations and jerking of the vehicle in operation. The core material selected is of the character which deforms somewhat to prevent vibrations from being transmitted therethrough.

The column jacket 64 surrounding the shiftable shaft 78 is in turn surrounded by a multi-sectioned shroud 80 comprising a fixed section 82 which is fast to the upper end of the column jacket 64, a movable section 90 which is journalled for circumferential rotation about the common axis 73 for the steering column members 60, 64 and 78 and substantially in the plane of the end of the last-named member, and another fixed section 119 which is fast to jacket 64 and longitudinally spaced from the fixed section 82 so as to receive the relatively rotatable section 90 therebetween. The enumerated sections 80, 90 and 119 while of a generally curvilinear cross section, will be seen to conform substantially to a cylindrically annular path of revolution lending a clean-lined appearance of smooth contour to the outside of the steering column.

The upper fixed section 82 is press-fitted at 84 to the upper end of the column jacket 64 and defines a cavity therewithin for receiving a turn signal switch mechanism 86 which is operated by the turn signal switch lever 50 extended outwardly of the chamber circumferentially normal to the longitudinal axis 73 of the steering column. A bundle of conductors 88 extends downwardly from the switch mechanism 86 and through the steering column. The rotatable section 90 is an assembly formed of upper and lower parts, 92, 94 which respectively provide a pair of half sockets 96, 98 disposed radially within the annular path of revolution of the jacket shroud 80. The upper part 92 of the rotatable section 90 has a bearing portion 100 which slidably engages the circumference of the column jacket 64 and which axially thrusts against a thrust bearing 102 backed by the fixed upper section 82. The upper part 92 overlaps with the upper fixed section 82 and provides a slight clearance gap 104 allowing for relative circumferential movement between the members. The upper part 92 has one or more radiating ribs 106 providing a corresponding number of apertured bosses 108 through which a like number of threaded fasteners 110 extend. The lower part 94 of the rotatable section 90 is provided with radiating ribs 112 which receive the threaded fasteners 110 in a manner to make the upper and lower parts 92, 94 detachably fastened to one another. The lower part 94 has an inner bearing portion 116 which slidably engages the circumference of the column jacket 64 and which axially engages a thrust bearing 117 held in place by an annular embossment formed on the column jacket 64. The upper and lower parts 92, 94 move together as a unit in a plane normal to the axis of the steering column and are prevented from axial shift therealong by means of the noted thrust washers 102 and 117. The lower part 90 overlaps with the fixed section 119 and provides a slight circumferential gap 118 which permits relative circumferential rotation between the two members. When the upper and lower parts 92, 94 are fastened together, their respective half sockets 96 and 98 cooperate to define a socket cavity in which a spherically formed enlarged portion 124 of the lever 52 is socketed. An anti-rattle element 120 is provided in the lower half socket 98 and is yieldably urged by a coil spring 122 into engagement with the spherically formed enlarged portion 124 of the lever.

It will be noted that the radius of curvature of the half sockets is slightly greater than the radius of curvature of the enlarged ball portion 124 with the result that slight axial movement against the yieldable urgings of spring 122 is permitted by enlarged portion 124 relative to the resulting socket. This socket formed of half sockets 96, 98 is open at its inner and outer ends and the lever 52 extends out through both these end openings even though they are of a relatively reduced size as respects the overall size of the socket. The lever 52 has a handle 126 at its outer end for manual operation thereof. The enlarged intermediate portion 124 of the lever 52 is of sufficient size to close off the reduced inner and outer end openings for the socket in the rotatable section 90, and owing to the disposition of the socket halves within the confines of the annular path of revolution of the shroud 80, the spherically formed lever portion 124 is confined wholly within the just-named annular path of revolution of the shroud 80. A bracket 130 and a fastener 128 secure an opaque case 132 to the relatively rotatable section 90. At one end the opaque case 132 has a protruding pointer 134 and contains an internal chamber 136 in which a light socket 138 is received. A light bulb 140 is retained by the socket 138 and effects connection therein to a conductor 142. The light socket 138 is grounded through the bracket 130. A shoulder 144 carried by rotatable section 90 positions the light socket 138 and the light bulb 140 in the chamber 136. The chamber 136 has an opening 146 which, according to the various positions assumed by the rotatable section 90, registers with various indicia appearing on a translucent dial 148 secured to the upper fixed section 82. These indicia are preferably indented in the face 150 of the dial 148 and more particularly appear in Figure 2.

The inner end of the lever 52 protrudes radially inwardly through a gate 151 in the column jacket 64 extending circumferentially normal to the longitudinal column axis 73, and is formed so as to have a pair of opposed fork portions 152. Each of the fork portions 152 carries a trunnion 154 which extends into reinforcing collars 155 carried at diametrically opposite sides of the shiftable tube 78. The trunnions 154 carried by the lever fork portions are constrained to movement in a rectilinear path along the axis 73 of the steering column and accordingly, the spherically formed enlarged intermediate portion 124 of the lever 52 will travel slightly inwardly and outwardly with respect to the socket halves 96, 98 as the lever 52 for the operating mechanism is moved in the plane of longitudinal axis 73, that is, moved in the plane of the paper in Figure 3. The spring urged anti-rattle element 120 prevents unrestrained motion of the enlarged portion 124 in the movement just described in taking up the limited clearance within the socket halves 96, 98 in which the portion 124 is socketed. Motion of the lever 52 in a manner to cause rotation of the shaft 78, that is, motion of the lever 52 in the plane of the paper in Figure 2, causes a corresponding motion of rotation of the rotatable shroud-section 90 with the result that no relative movement occurs between lever 52 and section 90. In other words, the entire ball-and-socket fulcrum 124, 96, 98 for the lever 52 moves in coordination with the lever 52 when the latter is moved in the plane of the paper in Figure 2 and there is no fulcral action involved whatever.

In the bottom end of the column jacket 64 a tubular spring seat section 156 is secured which receives a coil spring 158 engaging a nut 160 threadably received at the bottom end of the shiftable shaft 78. The spring 158 urges the shaft 78 in an axially upward direction within the steering column so as to tend to restore it to any position taken due to upward movement of the handle 126 on the lever 52. A laterally extending arm 162 is clamped between the nut 160 and a shoulder formed at the base of the shiftable shaft 78. At its outer end the arm 162 is slotted at 164 to receive a connection for a gear shifter rod, not shown. The arm 162 moves axially and rotatably with the shiftable shaft 78.

A bracket 166, welded to the column jacket 64, has an upstanding portion which is bent back on itself and supports a fixed pivot 168. A bellcrank 170 is supported for swinging movement by the fixed pivot 168 and has at one end an opening 172 for receiving a connection to a gear selector rod, not shown. The other end portion of the bellcrank is folded back on itself and at the fold carries a pin 174. The pin 174 slides in a slot 176 which extends circumferentially normal to the longitudinal axis 73 of the steering column and which is formed in a bracket 178 welded to the arm 162. The arm 162 extends laterally of the steering column jacket 64 through a gate 161 formed in the latter.

In operation of the operating mechanism, the shaft 78 and arm 162 are shifted axially along the column axis 73, and the pin and slot connection 174, 176 causes the bellcrank 170 and its outer connection portion 172 to move in an arc about the fixed pivot 168. Rotative motion of the shaft 78 and arm 162 relative to column axis 73 causes the arm 162 and its outer end to move in an arcuate path about the column axis 73 and yet the pin and slot connection 174, 176 permits such arcuate motion without disturbing the position of the gear selector bellcrank 170. This last motion is produced by manual operation of the hand lever 52 of the operating mechanism effective to cause oscillation of the lever in the plane of the paper in Figure 3, and is accompanied by slightly inward and outward movement of the spherically formed enlarged portion 124 of the lever 52 relative to the half sockets 96, 98 in which it is socketed. Moreover, the inner forked end of the lever 52 causes axial movement of the shiftable shaft 78 which is reflected by the described movement of the gear selector bellcrank 170. Movement of the hand lever 52 of the operating mechanism confined to the plane of the paper in Figure 2 is accompanied by rotative movement of the shiftable shaft 78 and rotatable movement of the gear shifter rod arm 162, all without any attendant movement in the gear selector bellcrank 170.

As herein disclosed, the invention is shown embodied in a remote control arrangement for a transmission of the manual gearshift type. It is evident that the present remote control arrangement will be equally effective in transmissions of other types and that the remote control can be equally well employed to control the so-called automatic transmissions of certain other type vehicles having transmissions including remote-controlled control valves therein which may or may not provide for a power shift while the vehicle transmission is in torque-transmitting operation. So also the drawing shows a ball-and-socket-jointed controlling lever of the first class (fulcrum situated between effort and resistance) which shifts slightly in translation relative to the shroud socket to accommodate axial shift of a concentrically shiftable controlled shaft 78, but self-evidently a controlled shaft can be provided which is within the shroud yet alongside the column jacket 64 rather than concentrically within it. The substantially curvilinear cross section of the column shroud shown conforms to a generally cylindrical path of revolution but, indeed, it is not essential to the invention that the shroud cross section conform to a cylindrical path of revolution, and it can include other annular paths of revolution and conceivably the cross section itself can take other curvilinear forms or broadly, take a rectilinear form or forms or a combination of curvilinear and rectilinear forms.

Variations within the spirit and scope of the invention described are equally comprehended by the foregoing description.

What is claimed is:

1. In a transmission control for an inclined steering column comprising a steering shaft and a steering column jacket disposed coaxially one within the other with an annular space between, spaced bearing means supported inside the steering column jacket, a tube journalled in said bearing means for axial and rotational movement in said space, a shroud for the steering column having longitudinally successive fixed and rotatable sections conforming to a generally cylindrical path of revolution about said column jacket, said rotatable section being rotatable about its central axis, and the tube having an upper end substantially in the plane of rotation of said rotatable section, said column jacket having a transverse slot adjacent the upper end of the tube and said shroud having an open-ended socket therewithin open at its inner and outer ends and arranged such that the longitudinal axis thereof is in registry with said transverse slot, and a lever extending successively through the socket and arranged to fulcrum against the walls thereof and through the registering slot and having an end forming a pivotal connection with the upper end of the tube for controlling axial and rotational movement of the tube in said bearing means, said lever having an enlarged intermediate portion disposed entirely within said cylindrical path of revolution and occupying said socket so as to close off at least the outer end opening of the latter.

2. In a transmission control for an inclined steering column comprising a steering shaft and a steering column jacket disposed coaxially one within the other with an annular space between, spaced bearing means supported inside the steering column jacket, a tube journalled in said bearing means for axial and rotational movement in said space, a shroud for the steering column having longitudinally successive fixed and rotatable sections conforming to a path of revolution of generally curvilinear section about said column jacket, said rotatable section being rotatable about its central axis, and the tube having an upper end substantially in the plane of rotation of said rotatable section, said column jacket having a transverse slot adjacent the upper end of the tube and said shroud having an open-ended socket therewithin open at its inner and outer ends and arranged such that the longitudinal axis thereof is in registry with said transverse slot, and a lever extending successively through the socket and arranged to fulcrum against the walls thereof and through the registering slot and having an end forming a pivotal connection with the upper end of the tube for controlling axial and rotational movement of the tube in said bearing means, said lever having an enlarged intermediate portion disposed entirely within said path of revolution and occupying said socket so as to close off at least the outer end opening of the latter.

3. In a transmission control for an inclined steering column comprising a steering shaft and a steering column jacket disposed coaxially one within the other with an annular space between, spaced bearing means supported inside the steering column jacket, a tube journalled in said bearing means for axial and rotational movement in said space, a shroud for the steering column having longitudinally successive fixed and rotatable sections conforming to a generally cylindrical path of revolution about said column jacket, said rotatable section being rotatable about its central axis, and said tube having an upper end substantially in the plane of rotation of said rotatable section, said column jacket having a transverse slot adjacent the upper end of the tube and said shroud having an open-ended socket therewithin open at its inner and outer ends and arranged such that the longitudinal axis thereof is in registry with said transverse slot, and a lever extending successively through the registering socket and slot and having an end forming a pivotal connection with the upper end of the tube for controlling axial and rotational movement of the tube in said bearing means, said lever having an enlarged intermediate portion disposed entirely within said cylindrical path of revolution and being fulcrally related to and occupying said socket so as to close off at least the outer end opening of the latter.

4. In a transmission control for an inclined steering column comprising a steering shaft and a steering column jacket disposed coaxially one within the other with an annular space between, spaced bearing means supported inside the steering column jacket, a tube journalled in said bearing means for axial and rotational movement in said space, a shroud for said column jacket having longitudinally successive fixed and rotatable sections conforming to a path of revolution of generally curvilinear cross section about said column jacket, said rotatable section being rotatable about its central axis, and the tube having an upper end substantially in the plane of rotation of said rotatable section, said column jacket having a transverse slot adjacent the upper end of the tube and said shroud having an open-ended socket therewithin open at its inner and outer ends and arranged such that the longitudinal axis thereof is in registry with said transverse slot, and a lever extending successively through the registering socket and slot and having an end forming a pivotal connection with the upper end of the tube for controlling axial and rotational movement of the tube in said bearing means, said lever having an enlarged intermediate portion disposed entirely within said path of revolution and being fulcrally related to and occupying said socket so as to close off at least the outer end opening of the latter.

5. In a transmission control mechanism for an inclined steering column having a column jacket and a steering tube supported therewithin, a shroud having fixed and rotatable sections at the upper end of said column jacket in surrounding relation thereto, shaft supporting bearing means at the upper end and at the lower end of said column jacket, a shaft having its end portions adjacent the respective said ends of said column jacket and being in spaced adjacency to said steering tube and supported in said bearing means for axial and rotatable movement with respect to said column jacket, the fixed and rotatable sections of said shroud conforming to a path of revolution of a generally curvilinear section and surrounding said column jacket and shaft, said rotatable section being journalled for circumferential rotation about said shaft in the vicinity of the upper bearing means and having a socket within said path of revolution and open at its inner and outer ends, and a lever extending through said socket having an enlarged intermediate portion fulcrally related to the walls thereof and closing off access to the socket through the outer end opening of the latter, and having outer and inner ends, said inner end having fork portions connected at diametrically opposite sides to the shaft so as to coordinate axial and rotational movement of the shaft in response to manually controlled movements of said lever.

6. In a transmission control mechanism for an inclined steering column having a column jacket and a steering tube supported therewithin, a shroud having fixed and rotatable sections at the upper end of said column jacket in surrounding relation thereto, shaft supporting bearing means at the upper and at the lower ends of said column jacket, a shaft within said column jacket and supported in said bearing means for axial and rotatable movement with respect to said column jacket, the fixed and rotatable sections of said shroud conforming to a path of revolution of a generally curvilinear section and surrounding said column jacket and shaft, said rotatable section being journalled for circumferential rotation about said shaft in the vicinity of the upper bearing means and having a socket disposed radially within said path of revolution and open at its inner and outer ends, a lever extending through said socket having an enlarged intermediate portion fulcrally related to the walls thereof and closing off access to the socket through the outer end opening of the latter, and having outer and inner ends, said inner end having a bifurcated portion connected at diametrically opposite sides to the shaft so as to coordinate axial and rotational movement of the shaft in response to manually controlled movements of said lever, and a shaft engaging coil spring coaxially arranged below said lower bearing means to urge said shaft and the inner end of said lever upwardly with respect to said column jacket.

7. In a transmission control mechanism for an inclined steering column having a column jacket and a steering tube supported therewithin, a shroud having fixed and rotatable sections at the upper end of said column jacket, shaft supporting bearing means at the upper and at the lower ends of said column jacket, a shaft, said shaft and said steering tube being disposed one within the other with said shaft being supported in said bearing means for axial and rotatable movement with respect to said column jacket, the fixed and rotatable sections of said shroud conforming to a path of revolution of a generally curvilinear section and surrounding said column jacket and shaft, said rotatable section being journalled between two adjacent fixed sections for circumferential rotation about said shaft in the vicinity of the upper bearing means and having a socket within said path of revolution and open at its inner and outer ends, cooperating parts connected to one of the two said fixed sections, and to the rotatable section and having indicia to indicate nominal rotative positions of the rotatable section, and a lever extending through said socket having an enlarged intermediate portion fulcrally related to the walls thereof and closing off access to the socket through the outer end opening of the latter, and having outer and inner ends, said inner end having a bifurcated portion connected at diametrically opposite sides to the shaft so as to coordinate axial and rotational movement of the shaft in response to manually controlled movements of said lever.

8. In a transmission control mechanism for an inclined steering column having a column jacket and a steering tube supported therewithin, a shroud having fixed and rotatable sections at the upper end of said column jacket, shaft supporting bearing means at the upper and at the lower ends of said column jacket, a shaft, said shaft and said steering tube being disposed one within the other with said shaft being supported in said bearing means for axial and rotatable movement with respect to said column jacket, the fixed and rotatable sections of said shroud conforming to a path of revolution of a generally curvilinear section and surrounding said column jacket and shaft, said rotatable section being journalled for circumferential rotation about said shaft in the vicinity of the upper bearing means and having a socket within said path of revolution and open at its inner and outer ends, and a lever extending through said socket having an enlarged intermediate fulcrum portion slidably engaging the walls thereof and closing off access to the socket through the outer end opening of the latter, and having outer and inner ends, said inner end having a bifurcated portion pivoted to the shaft at diametrically opposite sides of the latter so as to coordinate axial and rotational movement of the shaft in response to manually controlled movements of said lever.

9. In a transmission control mechanism for an inclined steering column having a column jacket and a steering tube supported therewithin, a shroud having fixed and rotatable sections at the upper end of said column jacket, shaft supporting bearing means at the upper and at the lower ends of said column jacket, a shaft concentric to said steering tube and supported in said bearing means for axial and rotatable movement with respect to said column jacket, the fixed and rotatable sections of said shroud conforming to a path of revolution of a generally curvilinear section and surrounding said column jacket and shaft, said rotatable section being journalled between two adjacent fixed sections for circumferential rotation about said shaft in the vicinity of the upper bearing means and having a socket within said path of revolution and open at its inner and outer ends, cooperating parts connected to one of the two said fixed directions, and to the rotatable section and having indicia to indicate nominal rotative positions of the rotatable section, and a lever extending through said socket having an enlarged intermediate fulcrum portion slidably engaging the walls thereof and closing off access to the socket through the outer end opening of the latter, and having outer and inner ends, said inner end having a bifurcated portion pivotally connected to the shaft at diametrically opposite sides of the latter so as to coordinate axial and rotational movement of the shaft in response to manually controlled movements of said lever.

10. In a steering column transmission control mechanism, said steering column including an inclined column jacket and a steering tube supported therewithin, the combination of shaft supporting bearing means at the top and bottom ends of said column jacket, a shaft, said shaft and said steering tube being disposed one within the other with said shaft being journalled in said bearing means for rotative and axial movement with respect to said column jacket, a shroud comprising a plurality of fixed and rotatable sections surrounding said shaft and said column jacket adjacent the said upper end of the latter, said plurality of sections conforming to a path of revolution of general curvilinear cross section and including a pair of fixed sections in longitudinally spaced relation, and a rotatable section journalled for circumferential rotation in the space between said pair of sections and formed of an assembly of axially detachably attached upper and lower parts, a socket portion carried by each of said parts and mutually cooperating when said parts are assembled to form the walls of a socket having reduced openings at its inner and outer ends and disposed within said path of revolution, and a double-ended lever extending through the socket and having an enlarged intermediate portion therewithin and slidably engaged by said socket walls so as to be held against substantial axial movement in the direction of said reduced end openings, the inner end of said lever having fork portions connected to diametrically opposite sides of said shaft for imparting manually controlled axial and rotative movement thereto.

11. In a steering column transmission control mechanism, said steering column including an inclined column jacket and a steering tube supported therewithin, the combination of shaft supporting bearing means at the top and bottom ends of said column jacket, a shaft concentric to said steering tube and journalled in said bearing means for rotative and axial movement with respect to said column jacket, a shroud comprising a plurality of fixed and rotatable sections surrounding said shaft and said column jacket adjacent the said upper end of the latter, said plurality of sections conforming to a path of revolution of general curvilinear cross section and including a pair of fixed sections in longitudinally spaced relation, and a rotatable section journalled for circumferential rotation in the space between said pair of fixed sections and formed of an assembly of axially detachably attached upper and lower parts, a socket portion carried by each of said parts and mutually cooperating when said parts are assembled to form the walls of a socket having reduced openings at its inner and outer ends and disposed within said path of revolution, and a double-ended lever extending through the socket and having an enlarged intermediate portion, at least one of said socket walls incorporating a yieldably mounted portion engaging the enlarged intermediate portion of the lever and yielding to permit slight axial movement of said lever, the inner end of said lever having opposed fork portions connecetd to the sides of said shaft for imparting manually controlled axial and rotative movement thereto.

12. In a steering column transmission control mechanism, said steering column including an inclined column jacket and a steering tube supported therewithin, the combination of shaft supporting bearing means at the top and bottom ends of said column jacket, a shaft having its end portions adjacent the respective said ends of said column jacket and being in spaced adjacency at all points to said steering tube and journalled in said bearing means for rotative and axial movement with respect to said column jacket, a shroud comprising a plurality of fixed and rotatable sections surrounding said shaft and said column jacket adjacent the said upper end of the latter, said plurality of sections conforming to a path of revolution of general curvilinear cross section and including a pair of fixed sections in longitudinally spaced relation, and a rotatable section journalled for circumferential rotation in the space between said pair of fixed sections and formed of an assembly of axially detachably attached upper and lower parts, a socket portion carried by each of said parts and mutually cooperating when said parts are assembled to form the walls of a socket having reduced openings at its inner and outer ends and disposed within said path of revolution, and a double-ended lever extending through the socket and having an enlarged intermediate portion disposed internally with a predetermined clearance therewithin and slidably engageable by said walls so as to take up said internal clearance and be held against substantial axial movement in the direction of said reduced end openings, at least one of said socket walls incorporating a yieldably mounted portion engaging the enlarged intermediate portion of the lever and yielding to permit slight movement of said lever, in taking up said internal clearance, the inner end of said lever having opposed fork portions connected to the sides of said shaft for imparting manually controlled axial and rotative movement thereto.

ELMER C. DODT.

References Cited in the file of this patent

UNITED STATES PATENTS

| Number | Name | Date |
|---|---|---|
| 1,515,236 | Woodward | Nov. 11, 1924 |
| 2,249,173 | Rawley et al. | July 15, 1941 |
| 2,455,204 | Wharam et al. | Nov. 30, 1948 |